(12) United States Patent
Abernathy et al.

(10) Patent No.: US 9,329,351 B2
(45) Date of Patent: May 3, 2016

(54) DROP CABLE

(71) Applicant: Corning Optical Communications LLC, Hickory, NC (US)

(72) Inventors: George Cornelius Abernathy, Hildebran, NC (US); Riley Saunders Freeland, Painted Post, NY (US); Christopher Mark Quinn, Hickory, NC (US); David Alan Seddon, Hickory, NC (US); Kenneth Darrell Temple, Jr., Newton, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/314,797

(22) Filed: Jun. 25, 2014

(65) Prior Publication Data

US 2015/0301296 A1    Oct. 22, 2015

Related U.S. Application Data

(63) Continuation of application No. 12/290,931, filed on Nov. 5, 2008, now abandoned.

(51) Int. Cl.
G02B 6/44 (2006.01)

(52) U.S. Cl.
CPC .............. *G02B 6/4402* (2013.01); *G02B 6/443* (2013.01); *G02B 6/4414* (2013.01); *G02B 6/4422* (2013.01); *G02B 6/4433* (2013.01);
(Continued)

(58) Field of Classification Search
CPC .. G02B 6/4402; G02B 6/4422; G02B 6/4426; G02B 6/4433; G02B 6/4484; G02B 6/4494
USPC ........................................ 385/109–111, 113
See application file for complete search history.

(56) References Cited

U.S. PATENT DOCUMENTS

| 4,166,670 A | 9/1979 | Ramsay ..................... 350/96.23 |
| 4,172,106 A | 10/1979 | Lewis ................................. 264/1 |
| 4,199,225 A | 4/1980 | Slaughter et al. .......... 350/96.23 |

(Continued)

FOREIGN PATENT DOCUMENTS

| JP | 57-165804 A | 10/1982 |
| WO | WO 01/98810 A1 | 12/2001 |

(Continued)

OTHER PUBLICATIONS

European Patent Office, European Search Report for European Application No. 09175029, Mailing Date Feb. 22, 2010, 2 pages.

*Primary Examiner* — Ryan Lepisto
(74) *Attorney, Agent, or Firm* — William D. Doyle

(57) ABSTRACT

A drop cable includes a jacket, first and second support members, and at least one optical fiber. The jacket has a oval-shaped cavity defined therein, where the minor dimension of the cavity is as small as about 0.25 mm and wherein the major dimension of the cavity is in a range of 0.25 mm to 10 mm. The first and second support members are arranged on opposing sides of the cavity and run generally longitudinally. The optical fiber is within the cavity and has a length greater than a length of the drop cable. Further, the optical fiber is in a substantially serpentine configuration in the cavity, where the serpentine configuration is substantially along a plane defined by a major axis of the oval-shape of the cavity.

20 Claims, 8 Drawing Sheets

(52) U.S. Cl.
CPC ............ *G02B6/4484* (2013.01); *G02B 6/4494*
(2013.01); *G02B 6/4426* (2013.01)

(56) References Cited

U.S. PATENT DOCUMENTS

| | | | |
|---|---|---|---|
| 4,420,220 A | 12/1983 | Dean et al. ................. | 350/96.23 |
| 4,909,592 A | 3/1990 | Arroyo et al. ............... | 350/96.23 |
| 5,125,063 A | 6/1992 | Panuska et al. ............... | 385/113 |
| 5,293,433 A | 3/1994 | Bernsen et al. ................ | 382/54 |
| 5,293,443 A | 3/1994 | Eoll et al. ...................... | 385/114 |
| 5,574,816 A | 11/1996 | Yang et al. .................... | 385/109 |
| 6,215,931 B1 | 4/2001 | Risch et al. ................... | 385/109 |
| 6,253,012 B1 | 6/2001 | Keller et al. ................... | 385/109 |
| 6,314,224 B1 | 11/2001 | Stevens et al. ................. | 385/113 |
| 6,563,990 B1 | 5/2003 | Hurley et al. ................. | 385/101 |
| 6,658,184 B2 | 12/2003 | Bourget et al. ............... | 385/100 |
| 6,718,101 B2 | 4/2004 | Le Noane et al. ............. | 385/109 |
| 7,123,802 B2 | 10/2006 | Engberg et al. ............... | 385/112 |
| 7,272,289 B2 | 9/2007 | Bickham et al. .............. | 385/128 |
| 7,277,615 B2 | 10/2007 | Greenwood et al. .......... | 385/100 |
| 2002/0001443 A1* | 1/2002 | Bringuier ...................... | 385/113 |
| 2006/0165355 A1* | 7/2006 | Greenwood et al. .......... | 385/100 |
| 2007/0025668 A1* | 2/2007 | Greenwood et al. .......... | 385/103 |
| 2008/0145010 A1* | 6/2008 | Overton et al. ............... | 385/115 |

FOREIGN PATENT DOCUMENTS

| | | |
|---|---|---|
| WO | WO 03/093890 A1 | 11/2003 |
| WO | WO 2006/034723 A1 | 4/2006 |
| WO | WO 2008/066782 A2 | 6/2008 |

\* cited by examiner

DROP CABLE

RELATED APPLICATIONS

This is a continuation of U.S. patent application Ser. No. 12/290,931 filed on Nov. 5, 2008, the content of which is relied upon and incorporated herein by reference in its entirety, and the benefit of priority under 35 U.S.C. §120 is hereby claimed.

FIELD

The disclosure relates to fiber optic cables, and in particular relates to methods of forming drop cables used in fiber optic telecommunications networks.

BACKGROUND

Fiber optic communication has experienced explosive growth. In just a few years, the transmission of communication signals for voice, video, data, and the like has soared, and more growth is planned as fiber optic communication technology improves and networks expand to provide greater access.

Fiber optic cables are the backbone of fiber optic communication systems. Fiber optic cables carry optical fibers and other cable elements, which are protected from the external environment by an external jacketing. The cable fibers may be surrounded by strength members and protective elements, and may be loosely disposed within tubes ("buffer tubes").

In so-called "fiber-to-the-X" (FTTX) networks, optical fiber cables that carry optical signals to a home or other locations from a connection point on the distribution cable are referred to in the art as "drop cables." To reduce the cost of FTTX networks, less expensive network components are sought, including less expensive drop cables. However, reduced costs of drop cables needs to be balanced with required performance specifications and tolerances, including bend tolerances of the fibers carried by the drop cables. Drop cables formed using methods that properly balance cost and performance considerations provide a simpler, cost-effective alternative to conventional field accessing and splicing of the distribution cable.

SUMMARY

A drop cable includes a jacket, first and second support members, and at least one optical fiber. The jacket has a oval-shaped cavity defined therein, where the minor dimension of the cavity is as small as about 0.25 mm and wherein the major dimension of the cavity is in a range of 0.25 mm to 10 mm. The first and second support members are arranged on opposing sides of the cavity and run generally longitudinally. The optical fiber is within the cavity and has a length greater than a length of the drop cable. Further, the optical fiber is in a substantially serpentine configuration in the cavity, where the serpentine configuration is substantially along a plane defined by a major axis of the oval-shape of the cavity.

DETAILED DESCRIPTION

Figure 1:
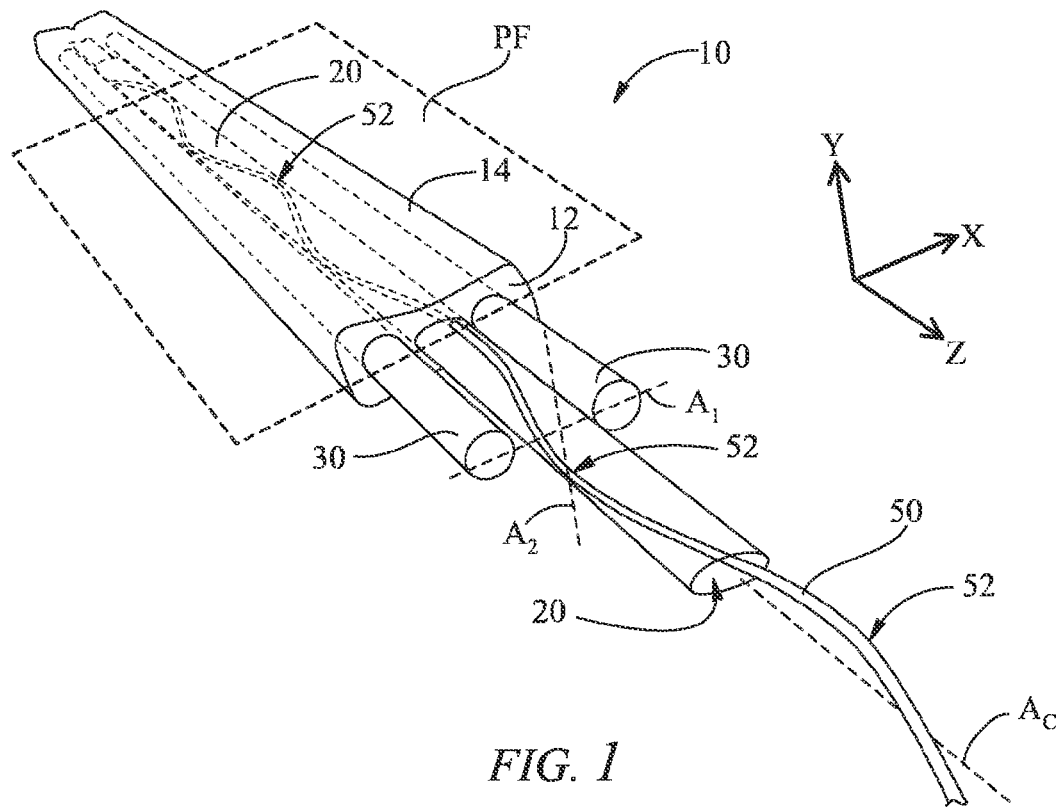
FIG. 1 is a perspective, partially cut-away view of an example embodiment of the drop cable of the present disclosure showing the oval cavity and the serpentine configuration of the optical fiber contained therein.

Reference is now made to preferred embodiments of the disclosure, examples of which are illustrated in the accompanying drawings. Whenever possible, the same or like reference numbers and symbols are used throughout the drawings to refer to the same or like elements or components.

The term "oval" as used herein is defined in the general sense as a substantially elongate shape that is free of sharp corners, angular edges or features, or like internal surface irregularities, that would cause the shape to substantially depart from an otherwise continuous and smooth closed curve; the term "oval" includes substantially elliptical shapes as defined by or that resemble the corresponding conic section.

An aspect of the disclosure includes a method of forming a drop cable having a length L. The method includes providing an extruder tip with an end through which at least one optical fiber is fed, arranging the extruder tip to extend within the die, and flowing a protective cover material: a) around the extruder tip and through the die so as to form a longitudinally extending central oval cavity that contains the at least one optical fiber and that has a major axis and a central axis; and b) around first and second strength members that reside substantially along the major axis on opposite sides of the oval cavity and that extend substantially parallel thereto. The method also includes tensioning the first and second strength members during the flowing of the protective cover material. The method further includes releasing the tension in the first and second strength members to shorten their length, and to reduce the length L of the drop cable and cause the at least one optical fiber to adopt a serpentine configuration within the oval cavity substantially in a plane defined by the major and central axes of the oval cavity.

Another aspect of the disclosure is a method of forming a drop cable. The method includes providing a protective cover material having an extrusion temperature TE such that 140° C.≤TE≤160° C. The method further includes extruding the protective cover material through a die with a single aperture that defines the cable's elongate cross-sectional shape to cover first and second strength members on either side of at least one optical fiber, and forming an oval cavity that has major and central axes and surrounds the at least one optical fiber.

Another aspect of the disclosure is a method of forming a drop cable. The method includes configuring an extruder with a tip with a fiber exit end that resides within a die having a single elongate aperture that defines the protective cover elongate cross-sectional shape. The method also includes providing a protective cover material having an extrusion temperature such that 140° C.≤TE≤160° C. The method further includes extruding the protective cover material through the die and around at least one optical fiber to cause the protective cover material to define an oval cavity surrounding the at least one optical fiber and having major and central axes. The method also includes providing first and second support members on respective sides of the extruder tip so that extruding the protective cover material covers the first and second support members substantially in a plane defined by the major and central axes.

Example Drop Cables

Figure 2:
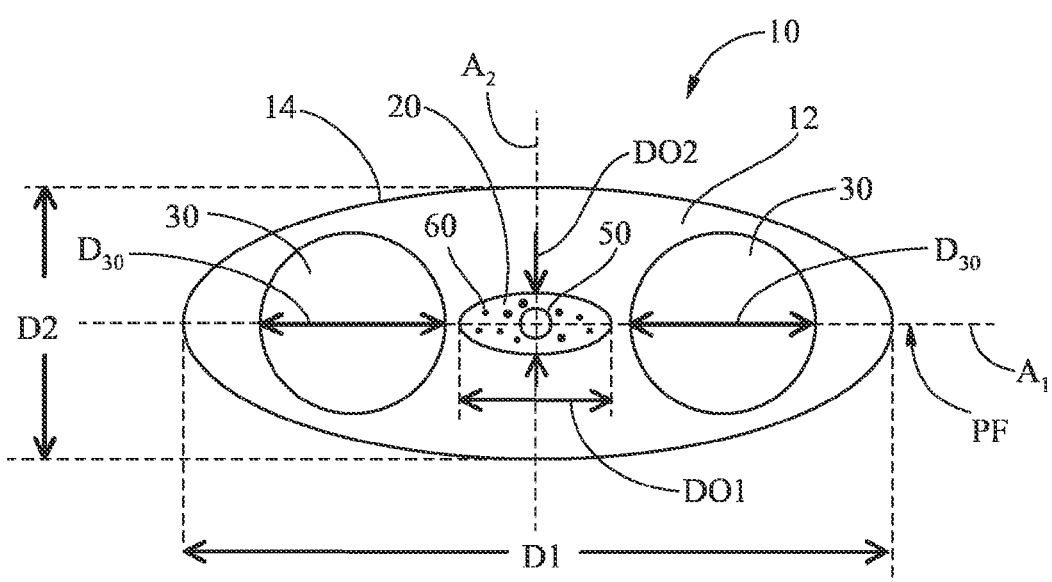
FIG. 2 is a cross-sectional view of the example drop cable of FIG. 1, showing the elongate cross-section of the protective cover and the oval cavity formed within the protective cover.

FIG. 1 is a perspective, partially cut-away view of an example embodiment of a drop cable 10 of the present disclosure. FIG. 2 is a cross-sectional view of the example drop cable 10 of FIG. 1. Cartesian X-Y-Z coordinates are shown for reference. Drop cable 10 has an elongate body 12 with an outer surface 14 and a central axis $A_C$. Body 12 defines a substantially oval-shaped central cavity (hereinafter, "oval cavity") 20 having a central axis $A_C$ and major and minor axes $A_1$ and $A_2$ that are perpendicular to the central axis and in the X- and Y-directions, respectively. Oval cavity 20 is shown in FIG. 1 as projected out of body 12 for illustration. In an example embodiment, body 12 comprises polyethylene, polyvinylchloride (PVC), polyamide, or any of the other known extrudable materials used to form cable protective outer jackets. Body 12 is thus hereinafter referred to as "protective cover" 12 because it surrounds and protects the elements within drop cable 10. Protective cover 12 has an elongate cross-sectional shape and is elongate in the same direction as oval cavity 20 (i.e., both are elongate in the X-direction, as shown in FIG. 1 and FIG. 2).

In an example embodiment, drop cable 10 includes first and second rod-like support members 30 that are arranged along the X-axis on respective sides of oval cavity 20, i.e., along the major axis $A_1$ of the central cavity, and run generally longitudinally (i.e., in the Z-direction) and substantially parallel to central axis $A_C$. In an example embodiment, support members 30 comprise glass-reinforced plastic (GRP) cylindrical rods. In other example embodiments, support members 30 are formed from, for example, FRPE, steel, aramid, ARP, thermoplastic, and like materials. Support members 30 have a diameter $D_{30}$ in an example embodiment as shown in FIG. 1 and FIG. 2 where they have circular cross-sections.

Drop cable 10 includes at least one optical fiber 50 contained within oval cavity 20. In an example embodiment, oval cavity 20 supports optical fiber 50 in a substantially serpentine (e.g., substantially sinusoidal) configuration substantially in a plane PF ("fiber plane") defined by oval cavity major axis $A_1$ and central axis $A_C$. Having oval cavity 20 allows optical fiber 50 to have an "excess fiber length" (EFL) (as compared to the drop cable length L) and also provides for fiber bends 52 in fiber plane PF ("fiber plane") that includes support members 30. The amplitude of the serpentine configuration of fiber 50 in oval cavity 20 is greater than that for a circular-shaped cavity of the same area and provides for the serpentine configuration to lie substantially in fiber plane PF, thereby allowing for an increased EFL, e.g., about a 28% greater EFL, as compared to a circular cavity. This in turn allows for drop cable 10 to be more robust with respect to flexibility, temperature cycling, and like considerations. In an example embodiment, cavity 20 is provided with a water-blocking material 60 for water blocking. In embodiments, water-blocking material 60 includes a gel, a water-swellable yarn, a water-swellable powder (e.g., a super-absorbent polymer, or "SAP"), or a combination thereof.

In an example embodiment, protective cover 12 has a major diameter D1 along major axis $A_1$ and minor diameter D2 along minor axis $A_2$. Likewise, oval cavity 20 has a major diameter DO1 along major axis $A_1$ and a minor diameter DO2 along minor axis $A_2$. In an example embodiment, D1=4.83 mm, D2=2.28 mm, DO1=0.66 mm, and DO2=0.30 mm.

Figure 3:
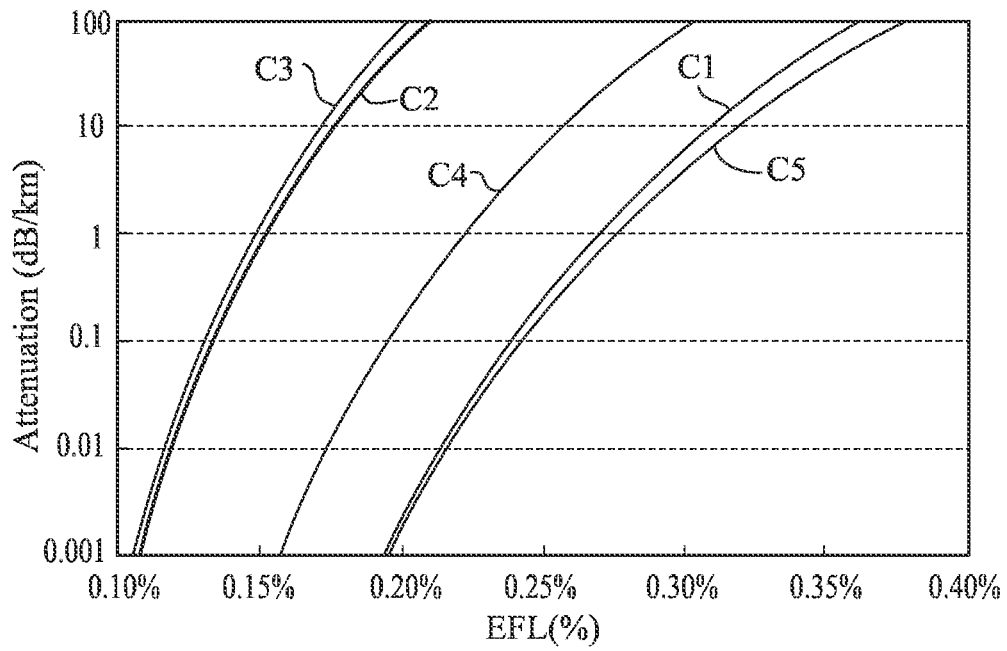
FIG. 3 is a plot of the attenuation in decibels per kilometer (dB/km) versus excess fiber length (EFL, %) for a variety of oval cavity eccentricities for a fixed cross-sectional area of a Corning SMF-28E fiber operating at a wavelength of 1550 nm, illustrating how an oval cavity can accommodate a substantial amount of EFL while maintaining a reasonably low attenuation as compared to other cavity shapes.

FIG. 3 is a plot of the attenuation in decibels per kilometer (dB/km) versus EFL (%) for a variety of oval cavity eccentricities (for a fixed cross-sectional area) of a Corning® SMF-28e® optical fiber operating at a wavelength of 1550 nm. Here, the "EFL (%)" is a measure of the excess fiber as compared to the actual length L of drop cable 10. Curve C1 represents the case of a circular cavity cross-section having a 0.47 mm diameter, wherein the fiber takes on a helical configuration. Curve C2 represents the case of a circular cavity cross-section having a 0.47 mm diameter, wherein the fiber wraps back and forth in the cavity due to the cavity symmetry. Curve C3 represents the case of a circular cavity cross-section having a 0.47 mm diameter, wherein the fiber has a sine wave configuration. Curve C4 represents the case of an oval cavity cross-section having major and minor diameters of DO1=0.58 mm and DO2=0.38 mm, wherein the fiber has a sine wave configuration. Curve C5 represents the case of an oval cavity cross-section having major and minor diameters of DO1=0.66 mm and DO2=0.33 mm, where the fiber has a sine wave configuration.

The plot of FIG. 3 indicates that curve C5 associated with an oval cavity having a 2:1 eccentricity accommodates the greatest amount of EFL (%) with the least amount of attenuation. Since drop cables tend to be relatively short (e.g., tens to hundreds of feet long) relative to distribution cables (whose length is measured in kilometers), their attenuation can be relatively high, e.g., 1 dB/km. Accordingly, at an attenuation of 1 dB/km, the EFL is about 0.28%.

Figure 4:
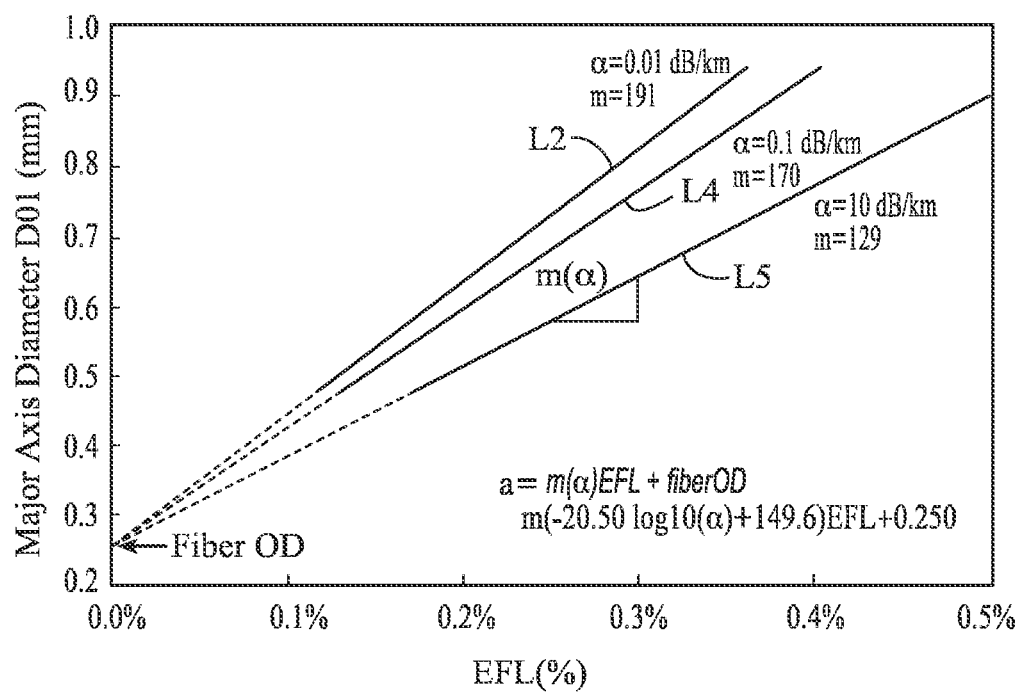
FIG. 4 plots the oval cavity major axis diameter DO1 (mm) versus the EFL (%) for the cavities corresponding to curves C2, C4 and C5 of FIG. 3.
Figure 5:
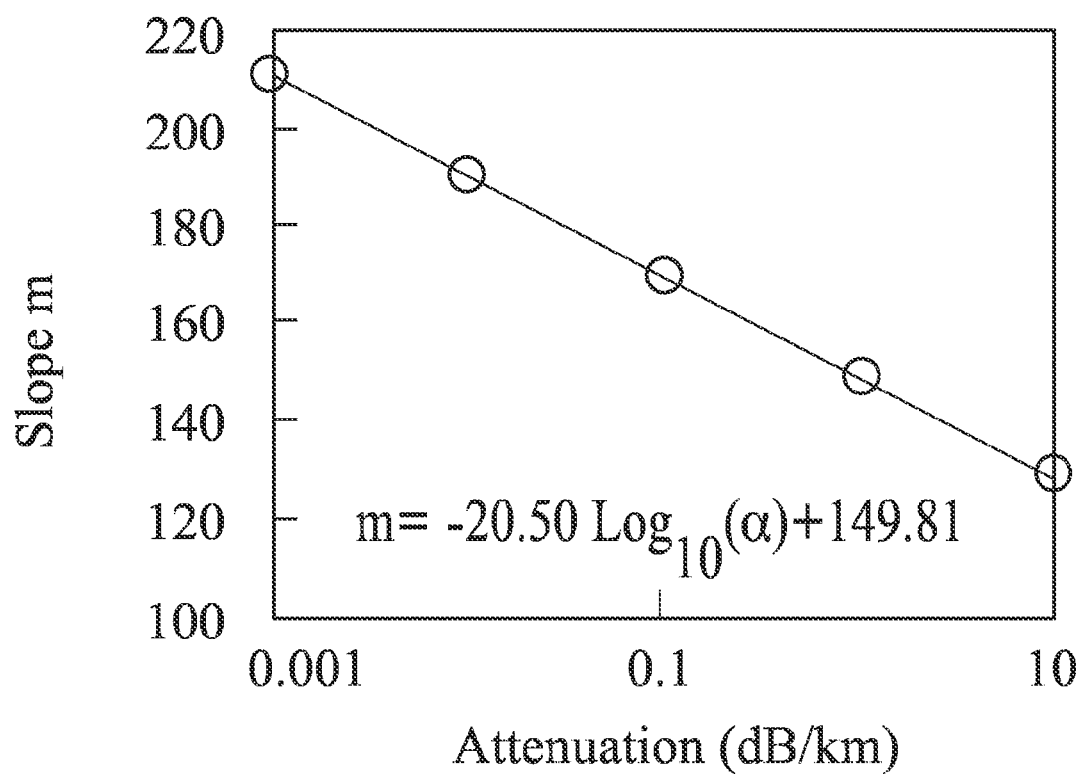
FIG. 5 plots the major axis diameter DO1 (mm) versus attenuation $\alpha$ (dB/km) in connection with the plot of FIG. 4.

FIG. 4 plots the major axis diameter DO1 (mm) of oval cavity 20 versus the EFL (%) for the cases corresponding to curves C2, C4 and C5 of FIG. 3. The corresponding lines L2, L4 and L5 are fit to the equation $$a = m(\alpha) \cdot \text{EFL} + \text{FOD}$$

wherein FOD is the outside diameter of the fiber and $m(\alpha)$ is the slope of the line in the plot of FIG. 5 of the major axis diameter DO1 (mm) versus attenuation $\alpha$ (dB/km), which slope is given by:

$$m(\alpha)=-20.5 \, \text{Log}_{10}(\alpha)+149.61.$$

FIG. 3 through FIG. 5 indicate that varying the major and minor diameters from a circle (DO1=DO2) to an ellipse (DO1>DO2) allows the attenuation limit to be extended for a given EFL (or more EFL for a given attenuation limit) for the same cross-sectional area of oval cavity 20. By way of example, where fiber 50 is Corning SMF-28E fiber, it is preferred that $m(\alpha) \geq 170$ so that an increase in the major axis diameter DO1 for oval cavity 20 is balanced with the attenuation loss and EFL (%).

Drop Cable Design Considerations

Most drop cables are intended for use in either ducts, direct burial, or aerial applications that subject the cable to various loads and environmental conditions. Thus, as discussed above, forming a low-cost drop cable 10 involves balancing cost savings with the necessary performance requirements that take into account the environmental conditions under which the drop cable is likely to be used.

Figure 6:
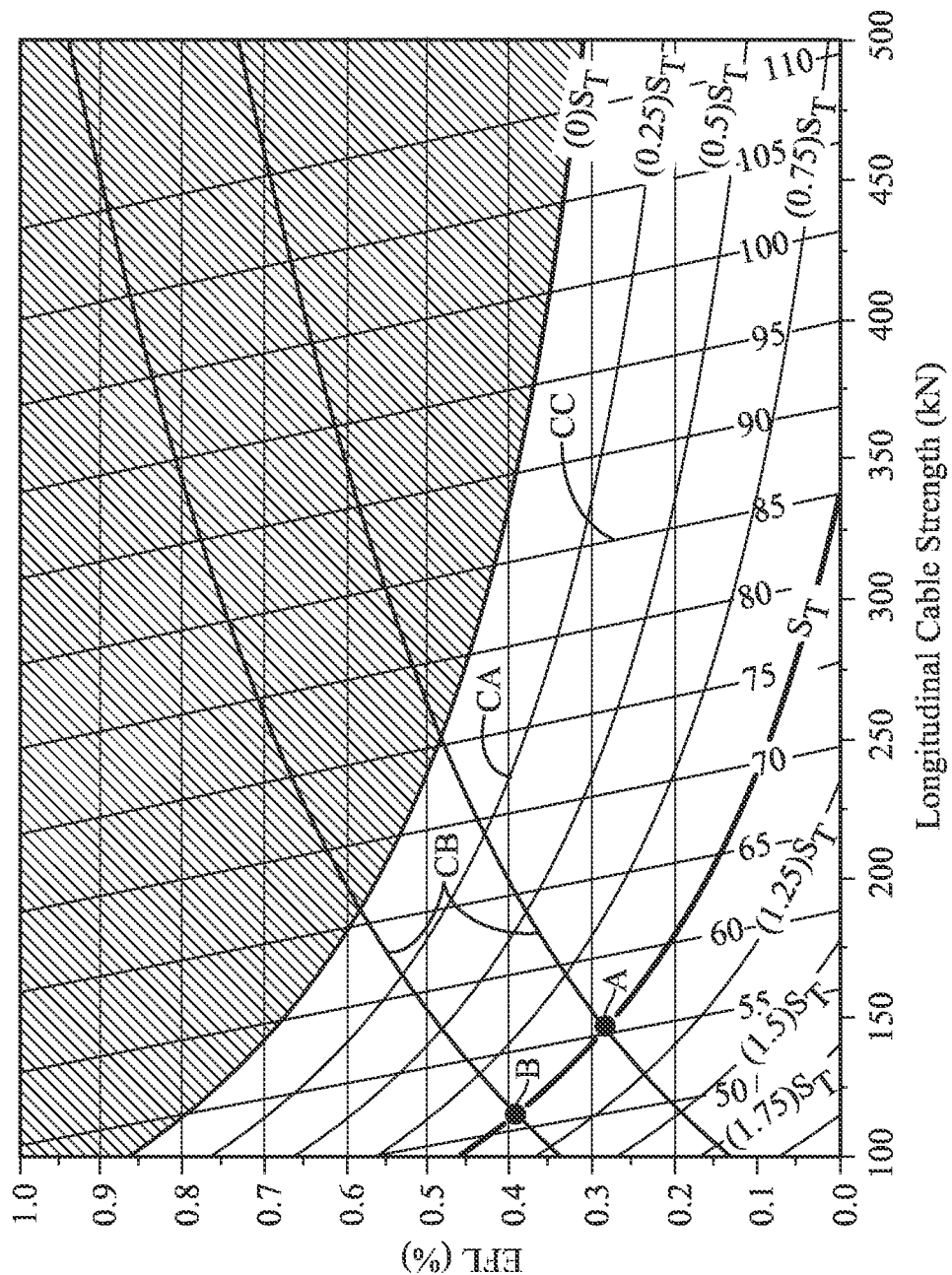
FIG. 6 is a contour plot of the EFL (%) versus the longitudinal cable strength (kN) for a 150 ft self-supported drop cable span under National Electrical Safety Code (NESC) heavy ice and wind loading conditions for three different parameters, illustrating the balance between drop cable cost and drop cable performance when forming an example drop cable for an aerial application using the methods disclosed herein.

Consider, for example, a drop cable 10 intended for an aerial application. FIG. 6 plots the EFL (%) versus the longitudinal cable strength (kilo-Newtons, kN) for a 150 ft self-supported span of drop cable under National Electrical Safety Code (NESC) heavy ice and wind loading conditions for three different parameters: fiber strain S at operating load (%) as represented by curves CA, the low-temperature limits of attenuation $\alpha$ as represented by curves CB, and the relative cost of drop cable 10 as represented by curves CC. The values for the low-temperature attenuation $\alpha$ have not been fixed for this example and precise thermal limits have not been calculated, but the general form is provided on the plot for illustration. The lower curve CB represents the attenuation limit for a standard fiber while the upper curve CB is for a bend-insensitive fiber.

The longitudinal cable strength on the x-axis corresponds to the diameters $D_{30}$ of the two strength members 30 so that a decrease/increase in the strength member diameters causes a decrease/increase in the overall diameter and weight of the cable. With respect to the fiber strain S represented by curves CA, in practice there is a maximum allowable amount of fiber strain S under load (i.e., a maximum strain limit $S_T$) that, when exceeded, greatly increases the fiber break rate. Thus, the strain limit line $S_T$ (shown in bold) is preferably not crossed in the direction that exceeds this limit. Likewise, there is a "no strain" limit represented by the "(0)$S_T$" contour curve for curves CA, and the shaded area of the plot represents a "no fiber strain" region where the fiber in drop cable 10 has no fiber strain (i.e., S=0) under its maximum operating load.

Consider now starting on the x-axis at where the cost contour CC has a comparatively high relative cost of 100, and where the cable strength is also relatively high (about 430 kN), and where fiber 50 has a strain S of just over (0.75)$S_T$. Moving to the left on the x-axis (i.e., EFL=0) to lower cable strengths enables a lower cost cable 10 to be made without the need for having excess fiber by essentially reducing the size (diameter) of support members 30 and thus the amount of material needed for protective cover 12.

This trend continues up to the point where the fiber strain limit $S_T$ for curves CA crosses the x-axis. At this point, further movement left (i.e., a further reduction in cable strength) is constrained along the $S_T$ contour; otherwise, this strain limit will be exceeded. However, following the $S_T$ contour to the left and upwards further decreases the cost of drop cable 10, but now requires increasing amounts of EFL. This trend of increasing amounts of EFL continues until the first (lower) low-temperature attenuation limit contour CB is reached at a point A. The amount of EFL required at position A is about 0.28%. This point represents an estimate of the balance between drop cable cost considerations and performance considerations for aerial applications.

Further movement to the left (lower cost) through the first low-temperature attenuation contour CB to the second (upper-most) counter CB and to a point B thereon is enabled by using a more bend-insensitive fiber 50. Alternatively, increasing the cavity size or the oval cavity eccentricity reduces the fiber strain S and allows for further cost reduction in the form of reduced strength-member diameters and less protective cover material.

The present disclosure thus includes forming drop cable 10 so that the at least one fiber 50 contained in oval cavity 20 has an amount of strain S in the range $0.25 S_T \leq S \leq S_T$. Also in an example embodiment, $(0.001)L \leq EFL \leq (0.004)L$, (i.e., $0.1\% \leq EFL \leq 0.4\%$).

Note also that oval cavity 20 serves to accommodate the corresponding amount of EFL without having to increase the drop cable size, as would be required in the case of a circular cavity, thereby maintaining a lower cost.

Methods of Producing Low-Cost Drop Cables

Figure 7:
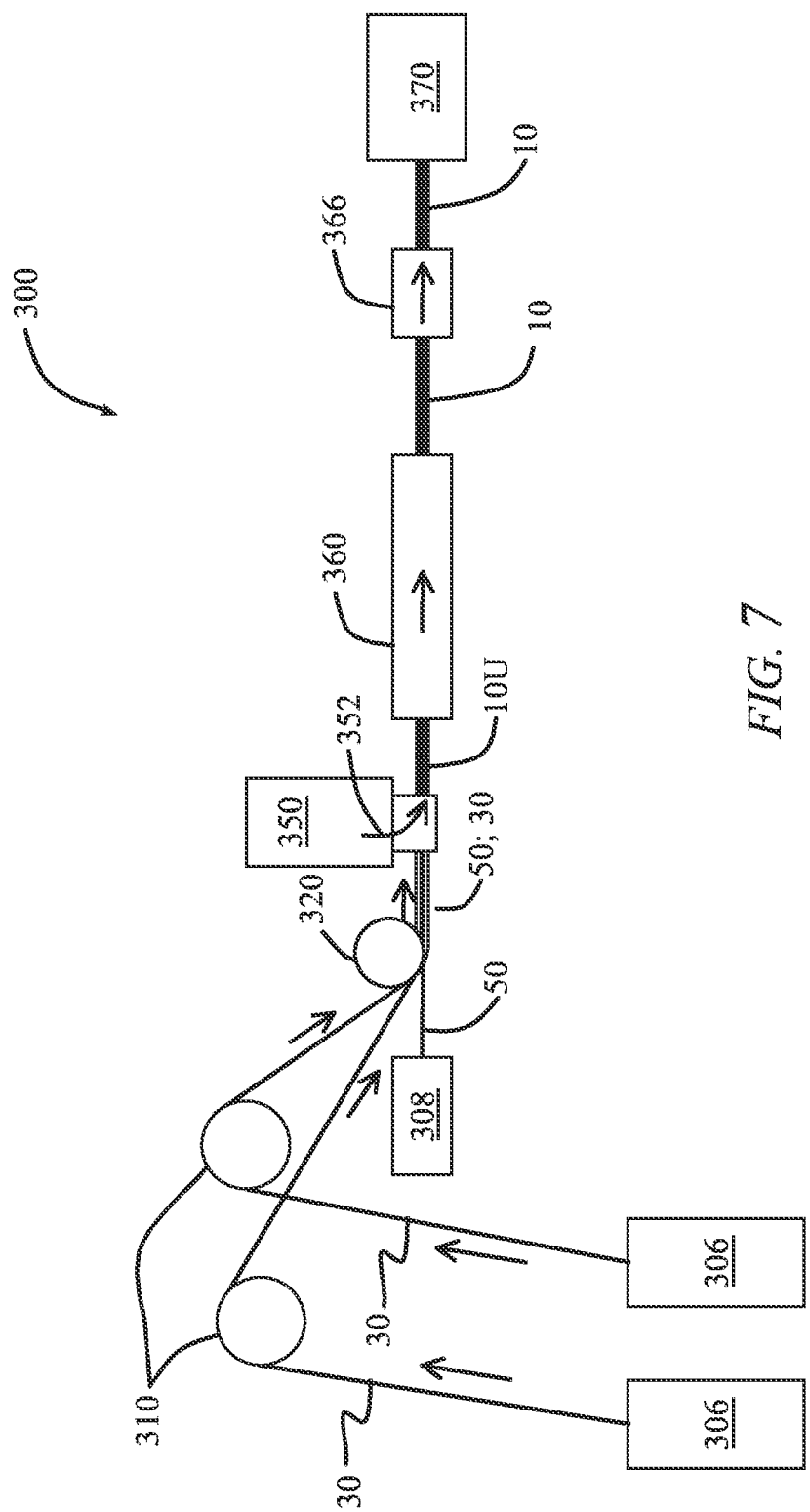
FIG. 7 is a schematic representation of an exemplary cable manufacturing apparatus for forming the low-cost drop cable using the methods disclosed herein.

An aspect of the present disclosure is directed to a cost-effective method of producing a low-cost drop cable 10. FIG. 7 is a schematic representation of an exemplary cable manufacturing apparatus ("apparatus") 300 for making low-cost drop cable 10 using methods of the present disclosure.

Apparatus 300 includes support member payoff units 306 that payoff lengths of support members 30, and a fiber payoff unit 308 that pays off fiber 50. Fiber payoff unit 308 may include, for example, one or more rotating wheels (spools) that pay off one or more fibers 50. Apparatus 300 illustrates a drop cable manufacturing method that employs a single optical fiber 50, but other numbers, including 2, 4, 6, etc., of optical fibers, or groups of fibers arranged in ribbons, for example, can be used. In example embodiments, other approaches, such as flying off, may also be used to pay off one or more optical fibers 50 and/or support members 30.

Apparatus 300 also includes tension capstans 310 around which support members 30 are tensioned. A load cell 320 is arranged to receive fiber 50 from fiber payoff unit 308 and support members 30 from tension capstans 310 and place them in their proper relative orientation for forming drop cable 10.

An extruder 350 is arranged downstream of tension capstans 310 and fiber payoff unit 308 and is configured to receive support members 30 and fiber 50 from load cell 320 and combine these elements with an extrusion material 352 (e.g., medium density polyethylene) that forms cable protective cover 12. An example extruder 350 is discussed in greater detail below. Note that tension capstans 310 allow tension to be placed on support members 30 during the extrusion process that takes place in extruder 350. This causes support members 30 to be stretched during the extrusion process as the protective cover extrusion material 352 encompasses the support members and fiber 50.

Extruder 350 is configured so that extruded material 352 is extruded in a manner that forms oval cavity 20 around fiber 50, as discussed in greater detail below. The cable structure formed upon exiting extruder 350 is still hot and is referred to herein as an "uncooled drop cable" 10U. Uncooled drop cable 10U needs to be cooled and such cooling is performed immediately downstream of extruder 350 using a cooling device 360. In an example embodiment, cooling device 360 includes a longitudinally extending trough filled with a cooling fluid (not shown) such as liquid water. Cooling device 360 cools the otherwise uncooled drop cable 10U and cooled drop cable 10 exits the cooling device. The resultant drop cable 10 passes through a tension-release device 366 (e.g., a "caterpuller") and is then collected on a take-up device 370 such as, for example, a take-up spool.

As discussed above, in an example embodiment it is beneficial from a cost viewpoint for the one or more fibers 50 of drop cable 10 to have a small amount of tension or strain and also have an EFL. Thus, in an example embodiment, the one or more fibers 50 are subject to controlled tensioning during manufacturing so that an increased tension or strain resides in fiber 50 after drop cable 10 is formed. In an example embodiment, such tension is imparted to the one or more fibers 50 at the fiber payoff step.

As noted above, tension capstans 310 serve to elongate (stretch) strength members 30. The stretched strength members 30 and strained fiber 50 enter extruder 350, wherein the molten extruding material 352 that forms protective cover 12 is applied. When cooled cable 10 exits tension-relief device 366, the tension-relief device releases the tension in strength members 30, thus causing them to relax. This in turn causes protective cover 12 to shrink in length while the length of fiber 50 remains substantially the same. This creates the desired EFL, which is accommodated in oval cavity 20 by fiber 50 taking on the aforementioned serpentine configuration in the fiber plane PF defined by central axis $A_C$ and major axis $A_1$ (see FIG. 1). In an example embodiment, the amount of EFL for fiber 50 is set between 0 and 0.4%, more preferably between 0.1% and 0.4%, and even more preferably between 0.2% and 0.4%.

Figure 8:
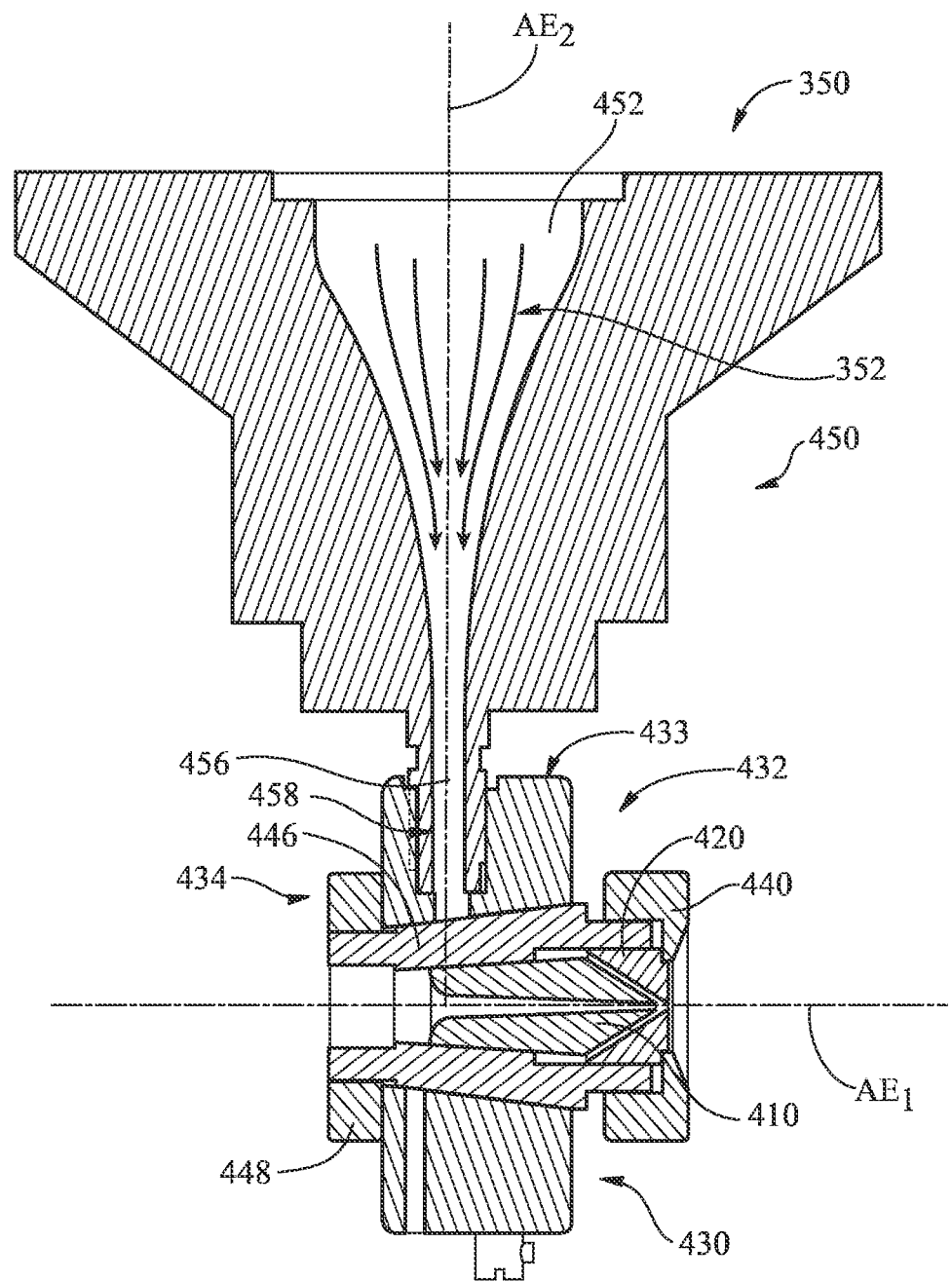
FIG. 8 is cross-sectional view of an example embodiment of an extruder that contains the tip and the die.
Figure 9A:
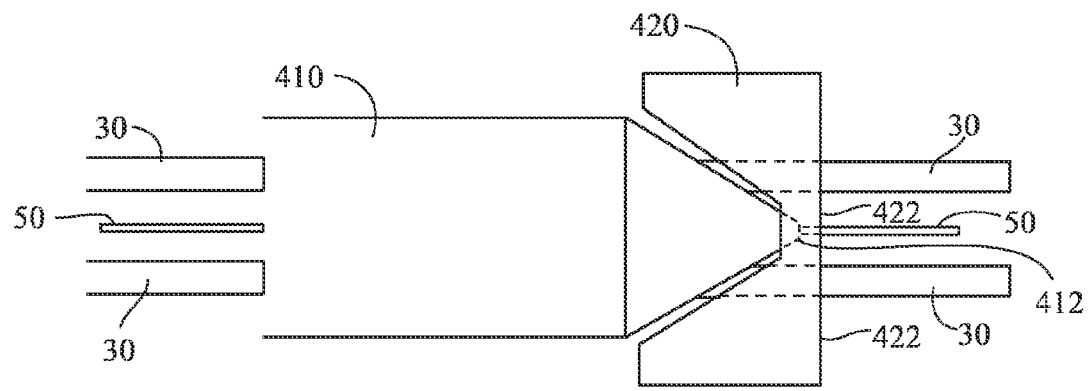
FIG. 9A is a close-up view of the tip and die along with a single fiber and the surrounding strength members, illustrating an example tip-die configuration that, in combination with the relatively low temperature of the protective cover material, serves to form the oval cavity in the protective cover.
Figure 9B:
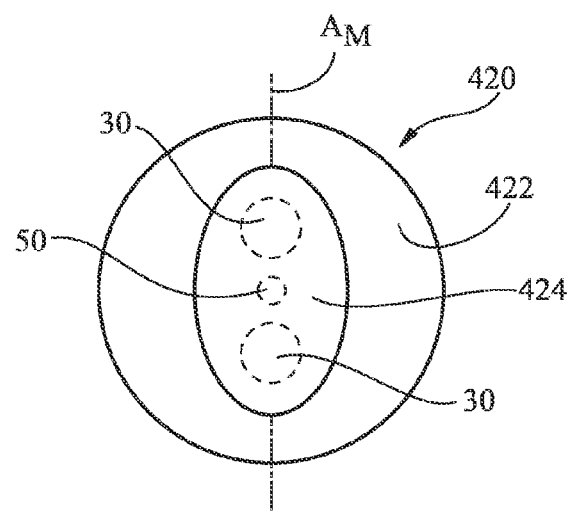
FIG. 9B is a front-on view of the die showing the single elongate aperture having a major axis $A_M$, and showing the relative positions of the fiber and strength members within the single aperture.

FIG. 8 is a cross-sectional view of an example embodiment of extruder 350 that contains a tip 410 with a fiber exit end 412 and die 420 with an end FIG. 9A is a close-up view of an example configuration for tip 410 and die 420 used to form drop cable 10. FIG. 9B is a front-on view of the die 420 showing a single elongate aperture 424 having a major axis $A_M$.

Extruder 350 includes a combination head 430 that includes a front end 432, sides 433, and a back end 434, wherein the combination head supports tip 410 and die 420 oriented along a first axis $AE_1$. Die 420 is held in place adjacent front end 432 with a die retainer nut 440. A flow diverter 446 is arranged around tip 410 and is configured to divert the flow of extruding material 352. Flow diverter 446 is held to combination head 430 with a flow diverter nut 448 at back end 434.

Extruder 350 also includes a feed unit 450 arranged along an axis $AE_2$ perpendicular to axis $AE_1$ and operably connected to combination head 430 at one of sides 433. Feed unit 450 defines a tapered chamber 452 that tapers into a channel 456 at a channel end 458. Channel end 458 connects to flow diverter 446. Tapered chamber 452 contains protective cover extrusion material 352, and feed unit 450 is used to feed the heated extrusion material into combination head 430 and through die 420 via the operation of flow diverter 446 and tip 410. In an example embodiment, combination head 430 is a Maillefer combination head available from Maillefer SA, Switzerland.

In an example embodiment, protective cover extrusion material 352 is extruded at a temperature TE that is substantially cooler than the normal extrusion temperature used in forming drop cables. The cooler temperature allows protective cover extrusion material 352 to better maintain its shape upon extrusion. In an example embodiment, the extrusion temperature TE is in the range 140° C.≤TE≤160° C. This range is about 60° C. cooler than the standard extrudate temperature, and increases the melt strength of the extrudate while also reducing the thermal load on fiber 50 during extrusion.

Also in an example embodiment, the spacing between tip 410 and die 420 is such that the fiber exit end 412 of the tip is inside the die, as shown in FIG. 9A. This configuration restricts the flow of extrusion material 352 around fiber 50 and gives rise to the formation of oval cavity 20. The tip and die spacing is controlled by die retainer nut 440. The cooler extrusion material temperature serves to maintain oval cavity 20 until uncooled drop cable 10U is cooled in cooling device 360. Surface tension effects cause the initially round central cavity defined by fiber 50 to be pulled into oval cavity 20 in the direction of die aperture major axis $A_M$, which defines the cavity major axis $A_1$. This transformation of the initially circular cavity defined by fiber 50 into oval cavity 20 is exacerbated upon the cooling of uncooled drop cable 10U, as described above. This obviates the need for a more complex die/tip configuration to form oval cavity 20.

In an example embodiment where water-blocking material 60 in the form of a gel is used, tip 410 and die 420 are configured to size the gel into an annulus surrounding fiber 50, which, in an example embodiment, has an outer diameter of about 0.45 mm. Since the tip/die is round and the cable profile is essentially oval, extrusion material 352 deforms the annulus of the gel on fiber 50 into oval cavity 20 formed in protective cover 12. Another example embodiment includes paying off water-blocking material 60 in the form of a water-swellable (e.g., a swell-fleece) yarn. In an example embodiment, the yarn is coated with a SAP, such as a partially cross-linked acrylate. In yet another example embodiment, water-blocking material 60 includes a gel, a water-swellable yarn, a water-swellable powder (e.g., a SAP powder), or a combination thereof, provided in oval cavity 20 during the extrusion process. An example method of including a water-swellable powder in a drop cable is disclosed in U.S. patent application Ser. No. 11/821,933, filed on Jun. 26, 2007, and entitled "Optical Fiber Assemblies Having Relatively Low-Levels of Water-Swellable Powder and Methods Therefor," which patent application is commonly owned and assigned, and is incorporated by reference herein. Example fiber optic cables having one or more water-blocking materials are described in U.S. Pat. Nos. 4,909,592 and 6,253,012, which patents are incorporated by reference herein.

In an example embodiment, dimensions of protective cover 12 of drop cable 10 are D1=4.83 mm nominal and D2=2.28 mm nominal (FIG. 2). In an example embodiment, the diameter DO2 of cavity 20 along minor axis $A_2$ is as small as about 0.25 mm, and the diameter DO1 along the major axis $A_1$ is in the range from 0.25 mm to 10 mm. Also, the drop cable cross-sectional shape can be round, flat, figure-eight-like, or dumbbell-like (e.g., sextic-like). In an example embodiment, DO1=0.66 mm nominal and DO2=0.30 mm nominal (FIG. 2).

In addition, strength members 30 need not have a circular cross-section, but can be, for example, elliptical or oval.

The drop cable methods of the present disclosure contemplate a number of variations to the example embodiment described above. For example, drop cable 10 can be formed with one or more fibers 50 within cavity 20. Further, the one or more fibers 50 can be bend-insensitive fibers, single-mode fibers, multimode fibers, or combinations thereof.

Figure 10:
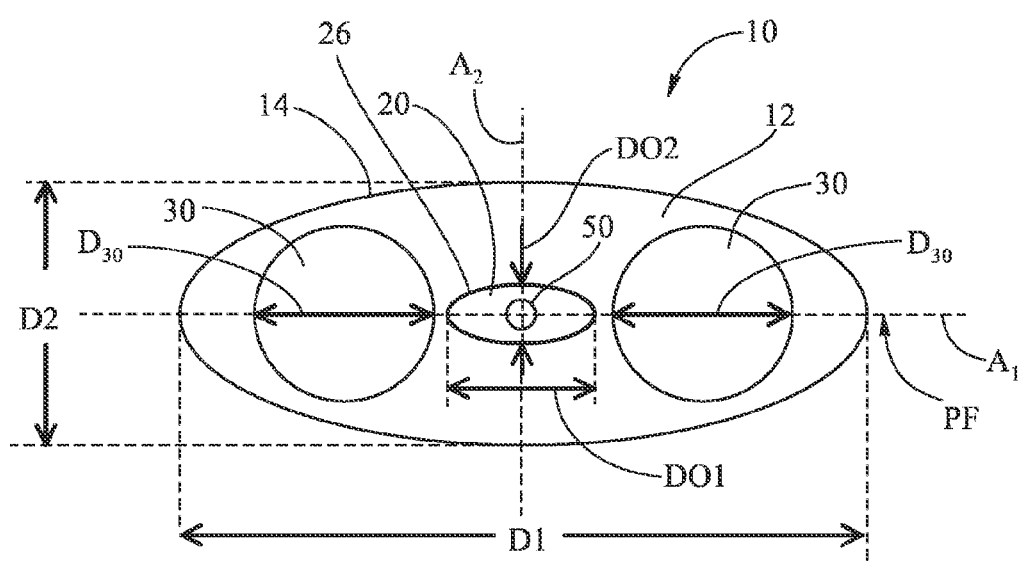
FIG. 10 is similar to FIG. 2 and shows an example embodiment wherein the oval cavity is formed using an oval buffer tube.

Also, in an example embodiment, cavity 20 is defined by an oval buffer tube 26, as shown in FIG. 10. In this example embodiment, oval buffer tube 26 is included in drop cable 10 by using either a two-step process or by accommodating the buffer tube in the extrusion process discussed above. While buffer tube 26 and protective cover 12 can be formed from the same material, they preferably are formed from different materials so that the protective cover does not bond to the buffer tube.

The methods of forming drop cable 10 as disclosed herein allow for the formation of a drop cable that has about 40% of the cable cross-sectional area of a typical drop cable, thereby reducing raw material costs significantly. The size of strength members is reduced to a diameter of, for example, 1.25 mm compared to the more common diameter of 1.6 mm. The amount and cost of protective cover material used is reduced by about one half.

Also, the buffering process step is eliminated by feeding the one or more optical fibers directly into the protective cover in a one pass/tubeless operation—with or without a filling compound (e.g., a gel), with or without providing a water-swellable yarn, and with or without a swell powder (e.g., SAP) powder. When a gel, yarn, or powder is used, the cavity size is typically small (less than 1 mm in diameter) and the EFL is placed in the cable using the above-described tension and release approach.

The oval cavity with EFL allows "regular" (i.e., non-bend-insensitive) fibers to meet attenuation performance. The oval cavity 20 allows the EFL to take a substantially sinusoidal path with a larger amplitude and a lower radius of curvature as compared to a circular cavity of the same cross-sectional area.

The smaller drop cable size also allows for easier storage of coiled drop cables. Typically, to cover the range of distances from a distribution cable to the connection site (e.g., a home or office), tens of different drop cable sizes are stocked. Thus, if a 200-foot drop cable is used over a 100-foot span, the excess cabling must be coiled and stored. Current Network Interface Devices (NIDs) have a storage container on the back, but these containers can only hold about 50 feet of drop cable. A drop cable formed using the present methods having a 40% reduced cross-sectional area can be coiled and placed in an NID at a much longer length, e.g., approximately 200 feet in the same 'box' as a 50 foot conventional drop cable. Ultimately, the number of part numbers stocked can be reduced to from about 3 to 5 versus about 10 to 15 for the typical drop cable. Likewise, the weight of the cable is reduced from about 4.3 pounds to about 1.5 pounds for a 200-foot coil. This results in lower shipping and handling costs.

Various modifications to the example embodiments of the disclosure can be made without departing from the spirit or scope of the invention in the appended claims. Thus, the disclosure covers modifications and variations provided they come within the scope of the appended claims and the equivalents thereto.

What is claimed is:

1. A drop cable, comprising:
   a jacket, wherein the jacket comprises an extrudable material, wherein the jacket has a cavity defined therein, wherein the cavity is oval-shaped, wherein the minor dimension of the oval-shape of the cavity is as small as about 0.25 mm, and wherein the major dimension of the oval-shape of the cavity is in a range of 0.25 mm to 10 mm;
   first and second support members, wherein the support members are arranged on opposing sides of the cavity, wherein the support members run generally longitudinally, and wherein the support members are rod-like; and
   at least one optical fiber, wherein the optical fiber is within the cavity, wherein the optical fiber has a length greater than a length of the drop cable, wherein the optical fiber is in a serpentine configuration in the cavity, and wherein the serpentine configuration is along a plane defined by a major axis of the oval-shape of the cavity.

2. The drop cable of claim 1, wherein the optical fiber has a length greater than that of the drop cable by between 0.1% and 0.4% of the length of the drop cable.

3. The drop cable of claim 2, wherein the extrudable material is extrudable at an extrusion temperature of at least 140° C. and no more than 160° C.

4. The drop cable of claim 1, wherein the cavity is a central cavity, the optical fiber includes fiber bends forming the serpentine configuration of the optical fiber, wherein the fiber bends are located in the plane defined by the major axis.

5. The drop cable of claim 1, wherein the jacket has an elongate cross-sectional shape.

6. The drop cable of claim 5, wherein the jacket is elongate in the same direction as the oval-shape of the cavity.

7. The drop cable of claim 1, wherein the support members run parallel to a central axis of the jacket, wherein the plane defined by the major axis intersects the first and second support members such that the distance between the optical fiber and the first and second support members measured in the direction of the major axis varies along the length of the drop cable.

8. The drop cable of claim 1, wherein the support member have circular cross-sections.

9. The drop cable of claim 1, wherein the support members comprise glass-reinforced plastic.

10. The drop cable of claim 9, wherein the support members comprise cylindrical rods.

11. The drop cable of claim 1, further comprising water-swellable yarn, wherein the water-swellable yarn is in the cavity.

12. The drop cable of claim 11, wherein the water-swellable yarn is coated with SAP.

13. The drop cable of claim 11, wherein the water-swellable yarn is coated with partially cross-linked acrylate.

14. The drop cable of claim 1, wherein the at least one optical fiber is only a single optical fiber.

15. The drop cable of claim 1, wherein the at least one optical fiber comprises a bend-insensitive optical fiber, thereby facilitating low-temperature performance of the drop cable.

16. The drop cable of claim 1, wherein the drop cable is configured for aerial applications and is self-supporting at a 150-foot span.

17. A drop cable, comprising:
   a jacket, wherein the jacket comprises an extrudable material, wherein the jacket has a cavity defined therein, wherein the cavity is a central cavity, wherein the cavity is substantially oval-shaped, wherein the minor dimension of the substantially oval-shape of the cavity is as small as about 0.25 mm, and wherein the major dimension of the substantially oval-shape of the cavity is in a range of 0.25 mm to 10 mm, wherein the jacket has an elongate cross-sectional shape, and wherein the jacket is elongate in the same direction as the substantially oval-shape of the cavity;

first and second support members, wherein the support members are arranged on opposing sides of the cavity, wherein the support members run generally longitudinally; wherein the support members are rod-like, wherein the drop cable is configured for aerial applications and is self-supporting at a 150-foot span; and at least one optical fiber, wherein the at least one optical fiber comprises a bend-insensitive optical fiber, thereby facilitating low-temperature performance of the drop cable, wherein the optical fiber is within the cavity, wherein the optical fiber has a length greater than a length of the drop cable, wherein the optical fiber is in a substantially serpentine configuration in the cavity, wherein the serpentine configuration is substantially along a plane defined by a major axis of the substantially oval-shape of the cavity.

18. The drop cable of claim 17, wherein the optical fiber has a length greater than that of the drop cable by between 0.1% and 0.4% of the length of the drop cable, wherein the jacket comprises at least one of polyethylene, polyvinyl chloride, and polyamide, and wherein the extrudable material is extrudable at an extrusion temperature of at least 140° C. and no more than 160° C.

19. A drop cable, comprising:

a jacket, wherein the jacket comprises an extrudable material, wherein the jacket has a cavity defined therein, wherein the cavity is substantially oval-shaped, wherein the minor dimension of the substantially oval-shape of the cavity is as small as about 0.25 mm, and wherein the major dimension of the substantially oval-shape of the cavity is in a range of 0.25 mm to 10 mm;

first and second support members, wherein the support members are arranged on opposing sides of the cavity, wherein the support members run generally longitudinally; wherein the support members are rod-like, wherein the drop cable is configured for aerial applications and is self-supporting at a 150-foot span; and at least one optical fiber, wherein the optical fiber has a length greater than that of the drop cable by between 0.1% and 0.4% of the length of the drop cable, wherein the optical fiber is within the cavity, wherein the optical fiber has a length greater than a length of the drop cable, wherein the optical fiber is in a substantially serpentine configuration in the cavity, wherein the serpentine configuration is substantially along a plane defined by a major axis of the substantially oval-shape of the cavity.

20. The drop cable of claim 19, wherein the cavity is a central cavity, wherein the jacket has an elongate cross-sectional shape, wherein the jacket is elongate in the same direction as the substantially oval-shape of the cavity, and wherein the support members run substantially parallel to a central axis of the jacket.

* * * * *